United States Patent

[11] 3,595,297

| [72] | Inventor | Leo Berg<br>Alstadten near Cologne, Germany |
| --- | --- | --- |
| [21] | Appl. No. | 773,583 |
| [22] | Filed | Nov. 5, 1968 |
| [45] | Patented | July 27, 1971 |
| [73] | Assignee | Knapsack Aktiengesellschaft<br>Knapsack bei Cologne, Germany |
| [32] | Priority | Dec. 20, 1967 |
| [33] | | Germany |
| [31] | | P 16 19 711.8 |

[54] APPARATUS FOR THICKENING OR CONCENTRATING HIGHLY FLUID SOLUTIONS
2 Claims, 1 Drawing Fig.

[52] U.S. Cl. .................................................. 159/4 R, 159/13 A
[51] Int. Cl. .................................................. B01d 1/16, B01d 1/22
[50] Field of Search ........................................... 159/4, 4 A, 13, 4 B, 4 C, 13 A, 4 E, 4 F, 4 MS, 4 R, 48 L; 261/DIG. 9, 112

[56] References Cited
UNITED STATES PATENTS

| 1,799,177 | 4/1931 | Perry .............................. | 23/2 |
| --- | --- | --- | --- |
| 2,089,945 | 8/1937 | Converse et al. ............... | 23/103 |
| 2,101,112 | 12/1937 | Vicary ............................ | 159/4 A |
| 2,590,905 | 4/1952 | Tomlinson et al. ............. | 159/4 A |
| 2,593,503 | 4/1952 | Tomlinson et al. ............. | 23/48 |
| 2,624,401 | 1/1953 | Schilt ............................. | 159/13 A |
| 2,873,799 | 2/1959 | Earley et al. ................... | 159/13 A X |

Primary Examiner—Norman Yudkoff
Assistant Examiner—J. Sofer
Attorney—Connolly & Hutz ABSTRACT: hot concentrated solutions, for example salt solutions, are thickened or concentrated in an apparatus comprising a tubular evaporator, a hot gas feedline, which is arranged to project into the evaporator, and a separator, which is arranged downstream of and connected to the evaporator, wherein the separator is arranged so as to continuously communicate through a connecting line with a receiver, which has a solution feedline and a number of pipelines attached thereto for connecting the said receiver to the tubular evaporator.

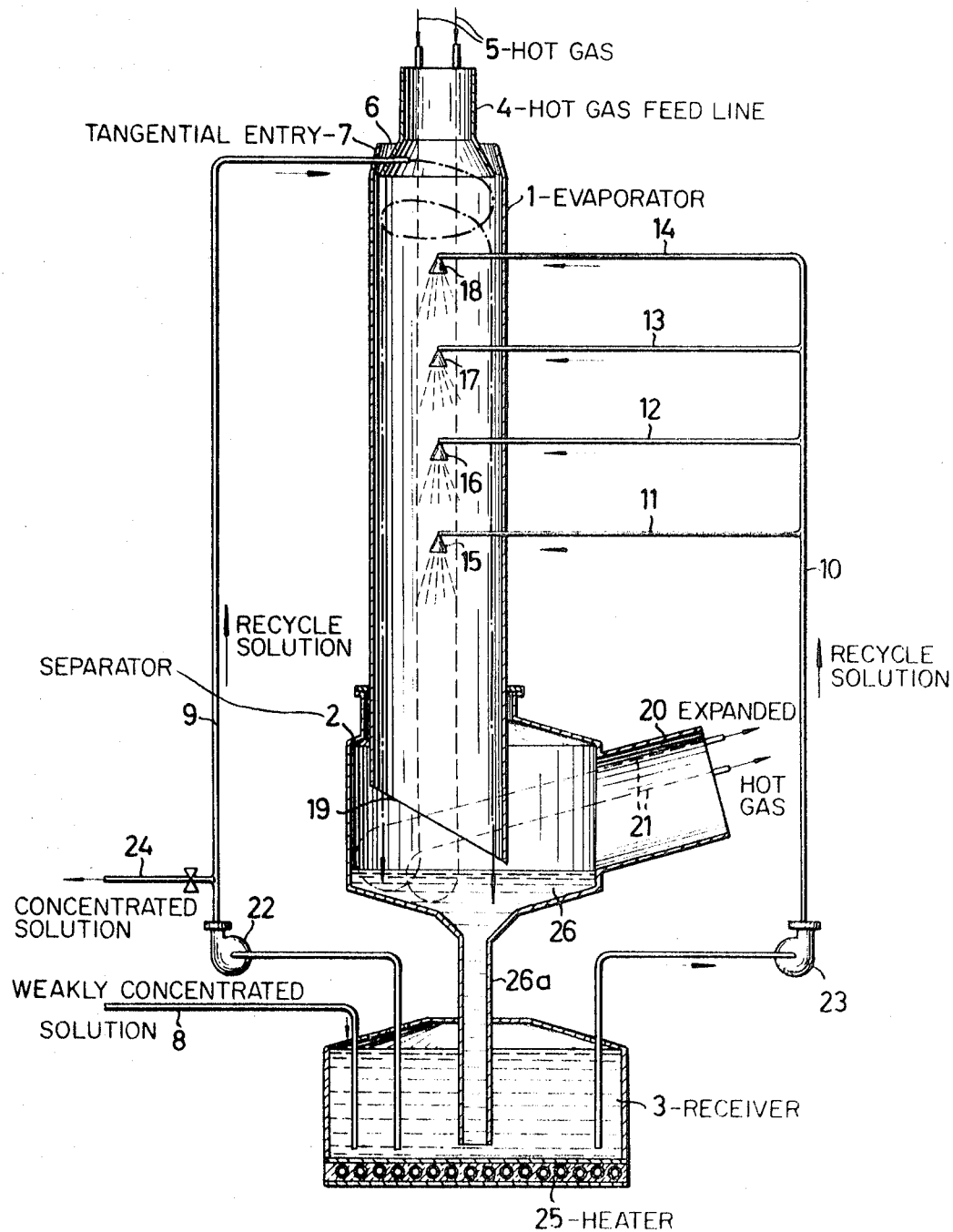

APPARATUS FOR THICKENING OR CONCENTRATING HIGHLY FLUID SOLUTIONS

The present invention relates to an apparatus for thickening or concentrating weakly concentrated solutions, for example salt solutions, the apparatus comprising a tubular evaporator, a hot gas feedpipe, which is arranged to project into the tubular evaporator, and a separator which is arranged downstream of and connected to the evaporator. The hot gas is a gas-carrying vapor extracted from the weakly concentrated solution and the separator is used for the extraction of concentrated solution from the carrier gas.

In an earlier apparatus of the type described above, a weakly concentrated solution is supplied to a vacuum evaporator via a preheater and a check valve device. The evaporator base portion receives the weakly concentrated solution and the evaporator top portion is charged with steam, which can be expanded in an associated expansion chamber. The vacuum evaporator base portion receiving the weakly concentrated solution has an associated branch line for removal of concentrated matter. Superheated steam, which can also be expanded in the expansion chamber, is used to heat the weakly concentrated solution in the vacuum evaporator. However, the apparatus so-far-described is not fully satisfactory insofar as it is required to be operated under vacuum using vacuum pumps, a condensator and a cooling installation, whereby it is rendered very costly and rather susceptible to disturbances, particularly with respect to the vacuum pumps. In addition, a separate heating source, i.e. steam generation facilities, are needed for operating the above apparatus, whose economy is too greatly affected by the high costs of energy.

The object of the present invention is to provide an apparatus for thickening or concentrating weakly concentrated solutions, which obviates the disadvantageous effects reported above and can be operated under normal conditions without the need to use a separate steam generation plant. This is achieved by the apparatus of the present invention wherein the separator is arranged continuously to communicate with a receiver which has an associated feedline for the supply of weakly concentrated solution and a number of pipelines connecting the receiver to the tubular evaporator. In this manner, it is possible to design an apparatus of the type described above which, however, needs no vacuum pumps so sensitive to disturbances and therefore combines great simplicity with unsusceptibility to disturbances under usually heavy, commercial working conditions. The present apparatus offers the further advantage of combining relatively small overall dimensions with relatively low construction costs.

In accordance with a further feature of the present apparatus one of the pipelines is arranged to project substantially tangentially into the upper end of the tubular evaporator and the other pipeline is subdivided into a number of branch pipes running to a plurality of nozzles, which are arranged on and along the center axis of the tubular evaporator. In other words a relatively low number of pipes is needed for the cycles between the receiver and tubular evaporator, and the risk of pipe clogging is minimized.

The present apparatus also provides for solution issuing through the first of the above pipelines to be conveyed helically along the inside wall of the tubular evaporator, and for solution issuing through the branch pipes to be delivered to the nozzles for injection into the hot gas. By the helical introduction of the solution into the tubular evaporator's upper end, it is possible to make a solution film flow over or sprinkle the evaporator inside wall. This enables contaminants to be washed away and cloggings inside the tubular evaporator to be obviated, so that the apparatus practically awaits no control or maintenance work. As mentioned above, the solution is injected into the hot gas whereby the two components are intimately mixed with one another. This is accompanied by good heat transfer from the hot gas to the solution and by good thickening or concentrating effects.

The lower end of the tubular evaporator can be telescoped into the separator and cut off at an angle inclined with respect to the center axis.

In order to obviate unnecessary flow deviation and to produce substantially undisturbed flow conditions the invention further provides for the hot gas feedline to be arranged so as to project into the frontal area of the tubular evaporator's upper end and for a pipe discharging expanded hot gas to be arranged so as to communicate with the separator.

Combustion gases, which are normally allowed to escape as unused waste heat, are preferably used as the hot gas.

Immersion pumps should be conveniently used for conveying the weakly concentrated solution from the receiver to the tubular evaporator.

The present invention further provides for the first pipeline to be connected to a concentrate-discharge pipe with a cutoff means. This enables resulting concentrate to be discharged continuously or intermittently without the need to arrest the whole apparatus. The receiver should be heatable to avoid solidification of the concentrate therein.

The present apparatus for thickening or concentrating weakly concentrated solutions, for example salt solutions, shown diagrammatically in the accompanying drawing, substantially comprises a tubular evaporator 1, a separator 2 and a receiver 3. Hot gas feedline 4 for the supply of hot gas 5 is arranged to project into tubular evaporator 1. More particularly, feedline 4 supplying hot gas 5 is arranged to project through the area 6 into the tubular evaporator's upper end 7, where it is conically enlarged to enable the hot gas to be partially expanded upon entering the upper portion of tubular evaporator 1. Separator 2 is connected to receiver 3 which has a feedline 8 for the supply of weakly concentrated solution, and two further pipelines 9 and 10 connecting receiver 3 to tubular evaporator 1. Pipeline 9 is arranged so as to project substantially tangentially into the upper end 7 of tubular evaporator 1. Pipeline 10 is subdivided into a number of branch lines 11, 12, 13, 14 running to nozzles 15, 16, 17, 18. These lie on and are distributed along the center axis of tubular evaporator 1. Solution travelling through pipeline 9 flows helically along the inside wall of the tubular evaporator, and solution flowing through branch pipes 11, 12, 13, 14 is delivered to nozzles 15, 16, 17, 18 to be injected into hot gas 5. The lower end 19 of tubular evaporator 1 is telescoped into separator 2 and cut off at an angle inclined with respect to the center axis.

Line 4 supplying hot gas 5 is arranged to project through frontal area 6 into the tubular evaporator's upper end 7, and line 20 discharging expanded hot gas 21 together with absorbed steam is connected to separator 2. Immersion pumps 22 and 23 are used to convey solution from receiver 3 to tubular evaporator 1. Line 9 is connected to a further concentrate-discharge line 24, capable of being shut off. Receiver 3 is heatable by means of heater 25, the heater being intended to prevent concentrate from solidifying or depositing in the receiver, upon standstill of the apparatus.

The apparatus of the present invention is operated in the following manner. Heat carrier 5, preferably a combustion waste gas, is conveyed through feedline 4, partially expanded near the tubular evaporator's upper end 7, and conveyed further through tubular evaporator 1 while transferring the bulk of its heat content to the quantity of vaporous matter withdrawn from the solution. The hot gas is completely expanded upon entering separator 2 and finally leaves the latter through gas discharge line 20, once it has been separated from the concentrated solution. At the same time, receiver 3 is fed through line 8 with weakly concentrated solution, of which a portion is introduced substantially tangentially by means of immersion pump 22 and line 9 into the upper end of the tubular evaporator, and of which a second portion is supplied by a further immersion pump 23, line 10 and branch lines 11, 12, 13, 14 to nozzles 15, 16, 17, 18. The solution, which can be circulated a number of times through the apparatus, if desired, is dehydrated, i.e. concentrated, and the concentrate is collected in the base portion 26 of separator 2, from where the concentrate is returned through connection line 26a to receiver 3 for removal by means of immersion pump 22 and line 24.

I claim:

1. An apparatus for concentrating weakly concentrated solutions, consisting of a vertical, cylindrical tubular evaporator, a hot gas feedline projecting into the upper end of the evaporator, a gas-liquid separator arranged and connected to the evaporator downstream thereof, an outlet conduit connected to the separator for discharging cooled expanded hot gas, a receiver, the separator being arranged continuously to communicate through a connecting line with the receiver, the receiver having a feedline supplying the weakly concentrated solution, first and second pipelines connecting the receiver to the tubular evaporator, the first pipeline being arranged to project and discharge substantially tangentially into the upper end of the tubular evaporator, and the second pipeline being subdivided into a number of branch lines running to a plurality of nozzles which are directed downwardly and distributed along the central axis of the tubular evaporator, and wherein the portion of solution issuing through the first pipeline being caused to flow helically along the inside wall of the tubular evaporator and the portion of solution traveling through the branch lines being delivered to nozzles to be injected into the hot gas and wherein the lower end of the tubular evaporator is telescoped into the separator and cut off so as to form an elliptical opening inclined with respect to the central axis, the elliptical opening being arranged so as to face the outlet conduit in a direction opposite thereto.

2. The apparatus as claimed in claim 1, wherein the receiver base portion is provided with a heating means.